US006650744B1

(12) United States Patent
Hamzeh et al.

(10) Patent No.: US 6,650,744 B1
(45) Date of Patent: Nov. 18, 2003

(54) METHOD AND APPARATUS FOR BROADCASTING AUDIO IN A COMMUNICATION SYSTEM

(75) Inventors: Mohamad Mozher Hamzeh, Nepean (CA); Mitchell Smith, Ottawa (CA)

(73) Assignee: Mitel Corporation, Ontario (CA)

( * ) Notice: Subject to any disclaimer, the term of this patent is extended or adjusted under 35 U.S.C. 154(b) by 0 days.

(21) Appl. No.: 09/563,552

(22) Filed: May 3, 2000

(30) Foreign Application Priority Data

May 6, 1999 (GB) .............................................. 9910495

(51) Int. Cl.[7] ................................................ H04M 1/60
(52) U.S. Cl. ......................... 379/170; 379/165; 379/171
(58) Field of Search ................................ 379/165, 170, 379/171, 101.01, 88.13, 88.25, 88.23, 88.18, 88.17, 88.15, 156, 159, 172, 173; 455/32.1

(56) References Cited

U.S. PATENT DOCUMENTS

| | | | | |
|---|---|---|---|---|
| 4,850,012 A | * | 7/1989 | Mehta et al. ................. | 379/157 |
| 5,454,032 A | * | 9/1995 | Pinard et al. ........... | 379/167.05 |
| 5,740,235 A | * | 4/1998 | Lester et al. ................ | 340/7.27 |
| 5,835,860 A | * | 11/1998 | Diachina ..................... | 455/458 |
| 5,912,958 A | * | 6/1999 | Eyran et al. ................. | 379/170 |
| 6,014,429 A | * | 1/2000 | LaPorta et al. | |
| 6,226,370 B1 | * | 5/2001 | Shih ............................ | 379/159 |
| 6,366,651 B1 | * | 4/2002 | Griffith et al. | |

* cited by examiner

*Primary Examiner*—Curtis Kuntz
*Assistant Examiner*—Barry Taylor
(74) *Attorney, Agent, or Firm*—F. Chau & Associates, LLP

(57) ABSTRACT

A Group Page process is implemented by which a variable audio source may be dynamically allocated circuit switch channels for broadcasting to a group of devices. The process is implemented via message exchanges between a Group Page Manager which accesses a data structure relating to the grouped devices, and a Paging Party Call Process associated with the party desirous of broadcasting an audio page.

6 Claims, 4 Drawing Sheets

METHOD AND APPARATUS FOR BROADCASTING AUDIO IN A COMMUNICATION SYSTEM

FIELD OF THE INVENTION

The present invention relates in general to voice communications, and more particularly to a method and apparatus for broadcasting audio to a large number of devices distributed across multiple controllers within a PBX (Private Branch Exchange).

BACKGROUND OF THE INVENTION

It is known in the art to broadcast a predetermined audio source (e.g. music-on-hold) to multiple devices (e.g. telephone sets in a PBX) via a dedicated circuit switch channel from the audio source and individual circuit switch channels to each of the devices. Conventionally, each circuit switch channel is allocated in transmit/receive (tx/rx) pairs.

The inventors have recognized the desirability of dynamically allocating circuit switch channels to a variable audio source for providing such features as paging and broadcast of multiple music sources. Furthermore, it is desirable that the number of circuit switch channels to the devices receiving the broadcast be minimized in order to optimize bandwidth usage.

SUMMARY OF THE INVENTION

It is an object of an aspect of the invention to dynamically allocate a minimum number of circuit switch channels from a variable audio source to one or a plurality of devices in a communication system, for broadcasting audio to the devices with minimal impact on the system switching bandwidth.

Therefore, according to an aspect of the invention there is provided a Group Page function for allowing a member (e.g. user or attendant) of a Page Group to broadcast audio to all other members of the Page Group such that the paged members hear the broadcasted audio through speakers at their sets. More particularly, a Page Group is established within a PBX switch, comprising member sets that are local to the associated switch. A Group Page Manager (GPM) process is established in the switch for controlling all Group Page requests on the switch. Typically, a request to page a Page Group is received by the GPM from a local or a remote paging party. The GPM performs all necessary checks, setup all of the necessary resources, manages the page and all associated messaging while the page is in process, and clears down the page upon its conclusion.

BRIEF DESCRIPTION OF THE DRAWINGS

An embodiment of the invention is described below with reference to the accompanying drawings, in which.

DETAILED DESCRIPTION OF THE PREFERRED EMBODIMENT

Figure 1:
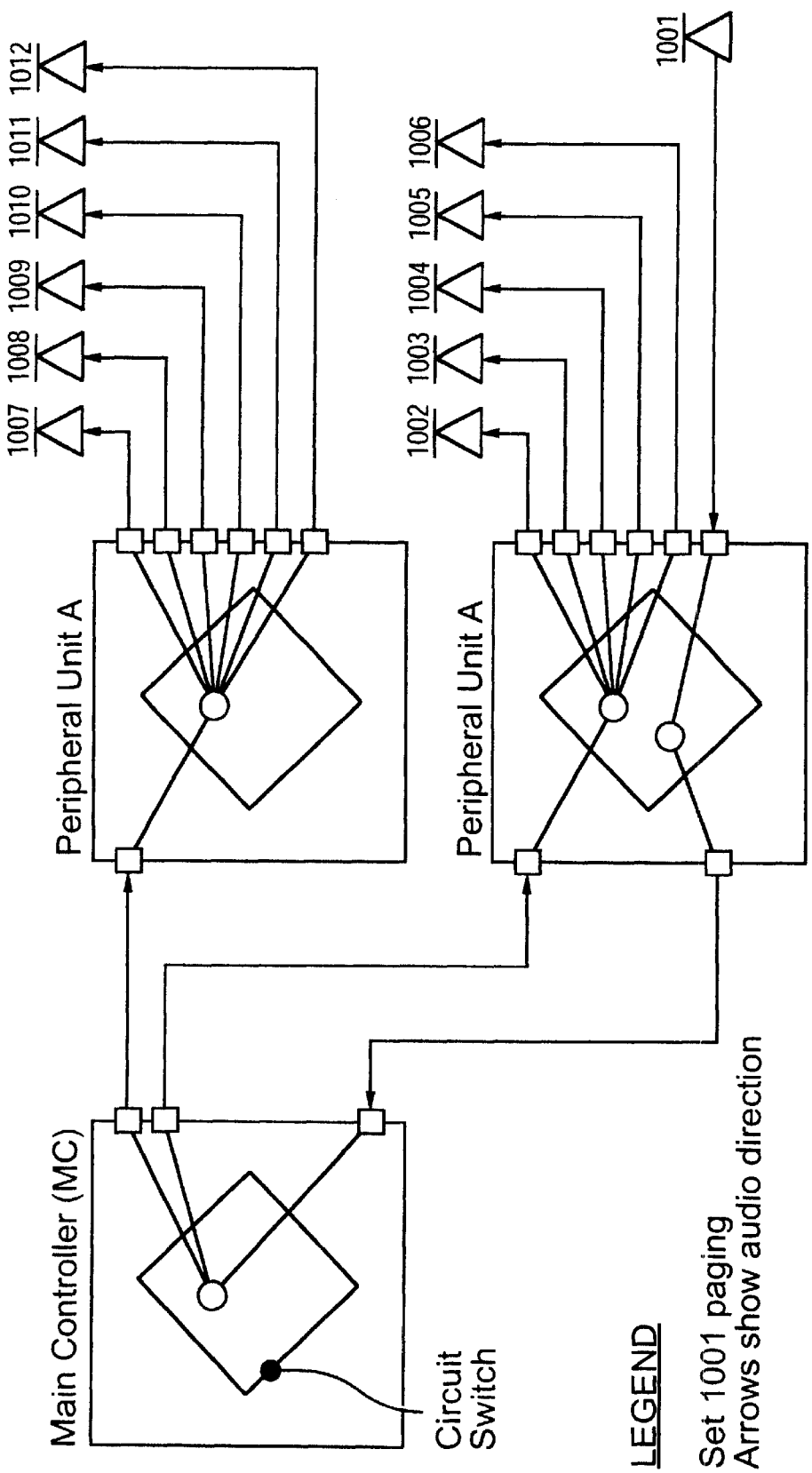
FIG. 1 is a schematic representation of an audio broadcast of a Group Page via circuit switching in a communication system according to the present invention.

FIG. 1 shows a conventional PBX configuration where a Group Page is invoked by set 1001 to a Page Group comprising sets 1002 through 1012. One Main Controller (MC) circuit switch channel is required to carry the broadcast signal from set 1001, and one MC circuit switch channel is required per peripheral cabinet to carry the broadcast to all of the sets attached to that peripheral. The distribution of the broadcast to the individual sets in the Page Group is carried out using the circuit switches of the peripheral cabinets. It will be noted that the Group Page is broadcast to the sets 1002 through 1012 using only three circuit switch channels instead of twelve, as would be required using conventional prior art methodologies.

In order to accomplish the aforenoted efficiencies in circuit switch bandwidth, a number of processes are required to be implemented in the Main Controller (MC) of the PBX. As shown in FIG. 3, a Group Page Manager (gpagemgr) process is invoked for storing and maintaining one or more local Page Groups, and a Paging Party Call process is invoked to handle page requests from a device connected to the PBX and in response seize the gpagemgr process. Briefly, in operation, the Group Page Manager identifies all of the devices associated with the page and evaluates their Class of Service (COS), Class of Restriction (COR) and Interconnect restrictions. It also determines whether the call is to be handled locally or should be delegated to a remote PABX. The Group Page Manager then fills out a Group Page data structure to include the paging party, the swids (software IDs) of the paged devices, and how they are connected to the page (e.g. via a peripheral node, etc.), as discussed in greater detail below with reference to FIG. 2. Subsequently, one way audio channels are established between the paging party (i.e. paging device) and the paged parties (i.e. paged devices) which, in the embodiment of FIGS. 1 and 3, are connected to the paging device via circuit switch channels of the MC and peripheral units (paged per).

As such, each page comprises two parties; i) a paging party, and ii) a paged party comprising a collection (i.e. group) of devices. The Group Page Manager acts only as a mediator and connection manager for the devices. Once the Group Page is setup, the Group Page Manager awaits messages pertaining to the page in progress (in addition to other group paging messages). These messages include a release request from a device in the paged group, which typically results from the device going off-hook, receiving a call, or a similar event. In this case, the audio connection to the device is disconnected, and the device is removed from the Group Page record. A cleardown message from the paging party indicates the conclusion of the page. In this case, all audio connections to the paged parties are cleared down.

Figure 2:
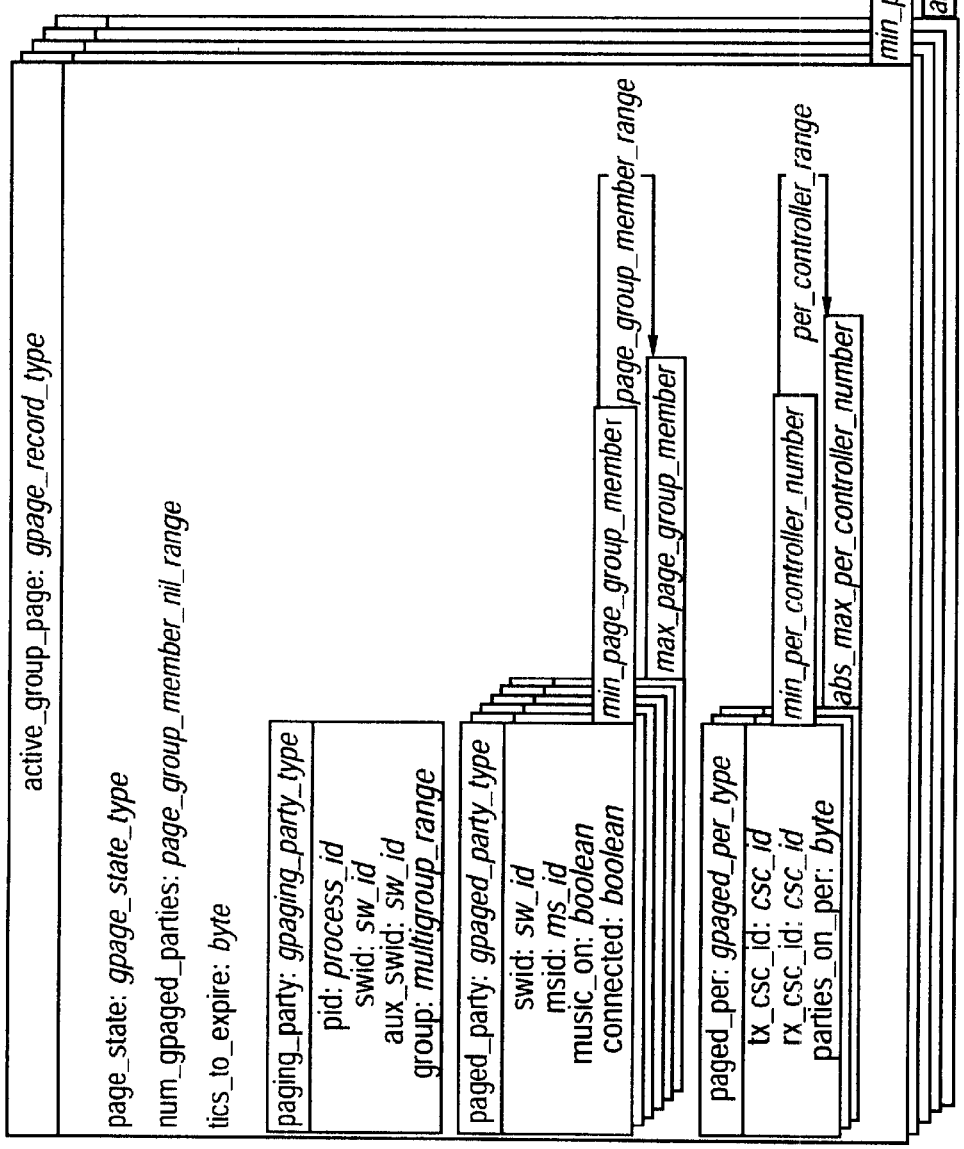
FIG. 2 is a schematic representation of a data structure for the Group Page process according to a preferred embodiment of the invention.
Figure 3A:
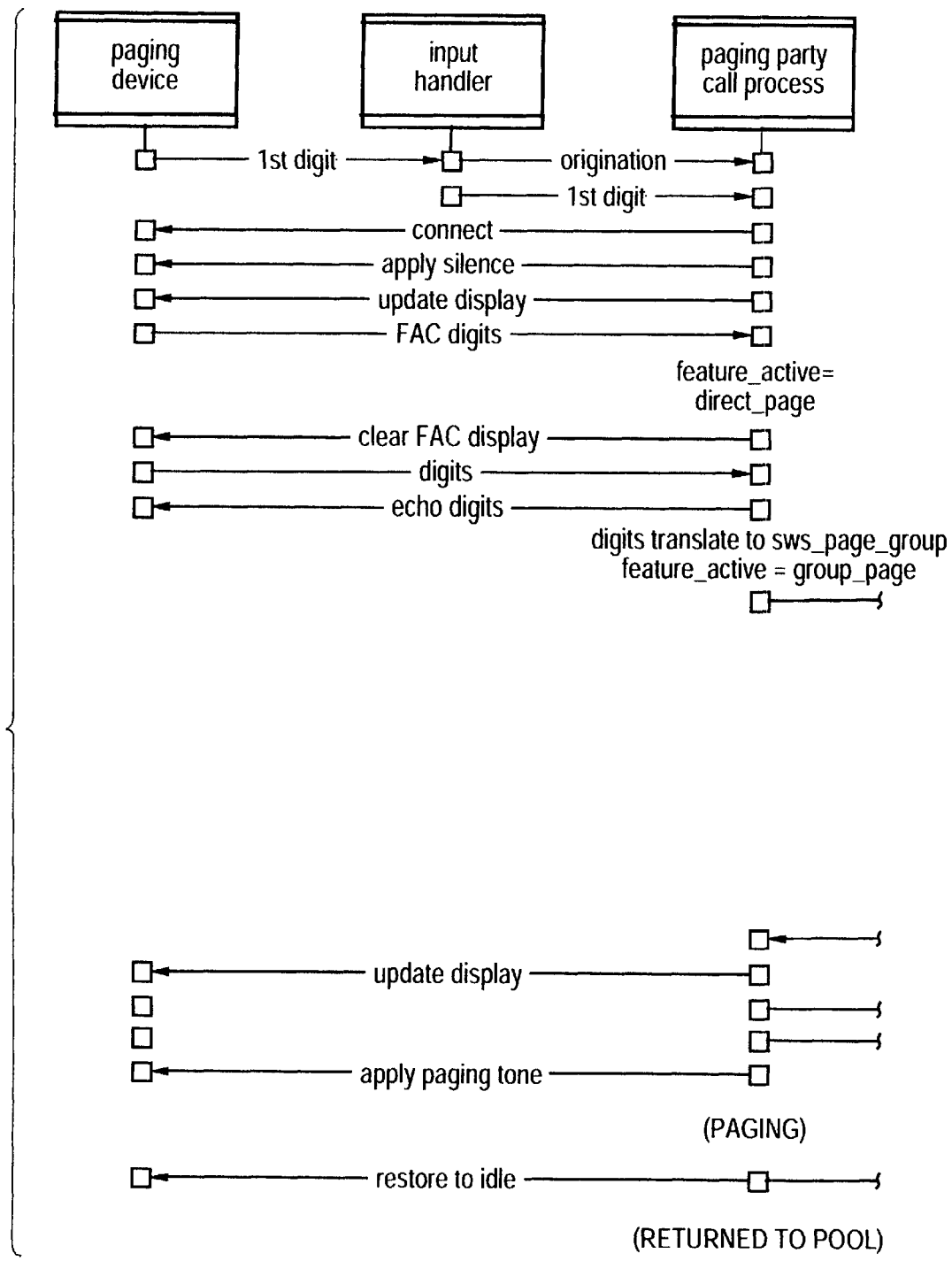
FIG. 3 comprises FIGS. 3A and 3B and is a timing sequence diagram showing an exchange of messages and actions for implementing the Group Page according to the present invention for an on-hook dialing scenario.
Figure 3B:
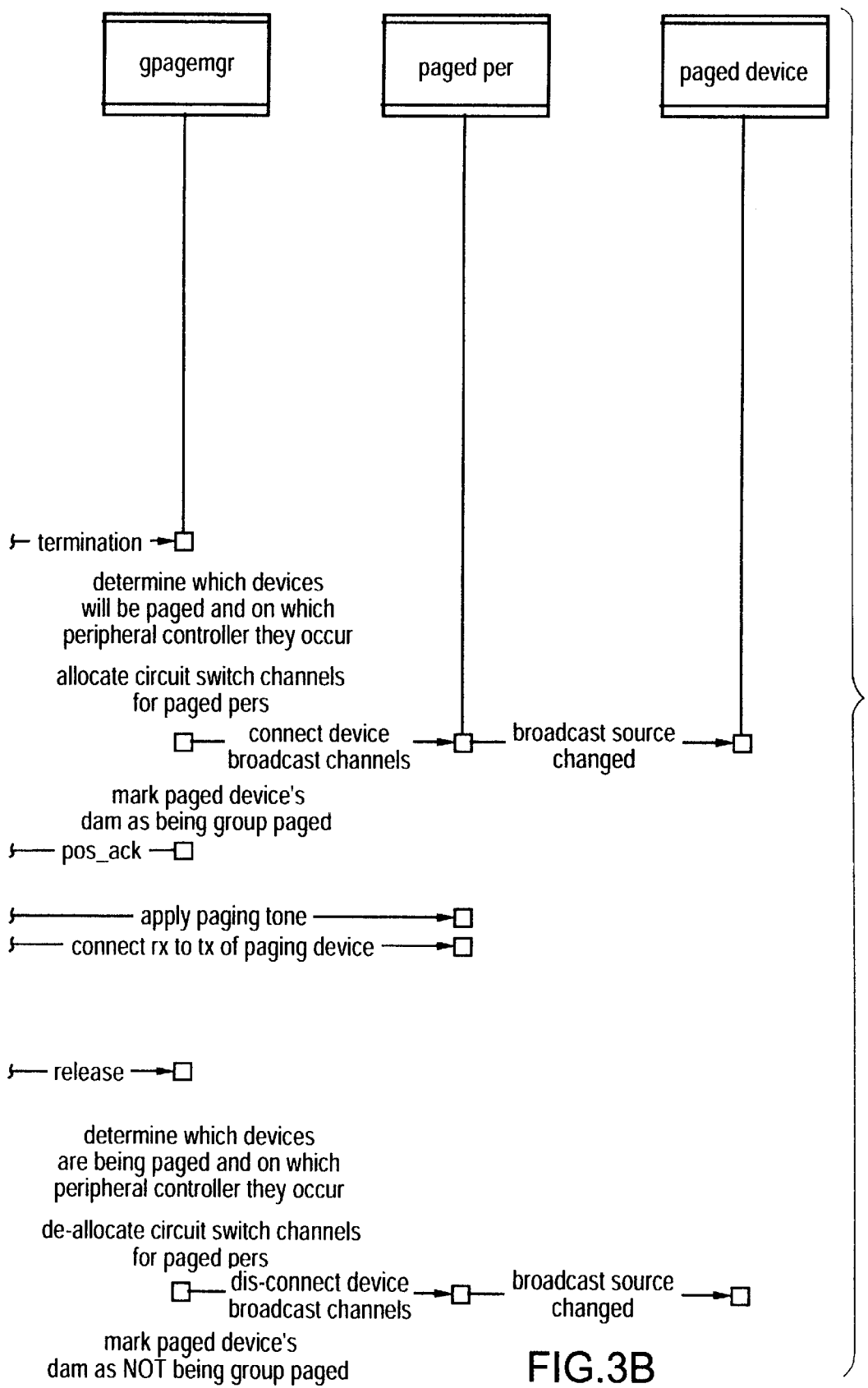

Before considering the detailed Group Page example of FIG. 3, reference will be made to the data structure managed by the GPM, as illustrated in FIG. 2.

Therefore, turning to FIG. 2, an example of an active_group_page array is shown which exemplifies the data structure used by the Page Group Manager process of the present invention. The active_group_page array is a collection of records that hold all relevant information about a page. At the time of system boot up, a permanent database is created on a Winchester drive of the Main Controller in which a software ID is allocated for each object programmed into the system, such as page groups, hunt groups, devices, etc. Each programmed group of devices is allocated a sws_page_group identifier. According to the present invention, a one-to-one mapping is established between the active_group_page array and the stored page groups (sws_page_group) in the system. Each sws_page_group has a corresponding active_group_page record such that:

sws_page_group.page_group_id~index of (active_group_page record)

Each active_group_page record consists of four parts: a header, a paging_party record, a paged_party array and a paged_per array.

The header of the active_group_page record comprises three fields: page_state, num_gpaged_parties and tics_to_expire.

The page_state fields contains an enumeration identifying the state of the Group Page as one of the following states:

```
gpage_state_type = (
    nil_gpage_state,
    gpage_indeterminate,
    gpage_idle,
    gpage_talk,
    gpage_aging );
```

The idle state denotes a page group that has not been paged in the past 15 minutes. In this case, all of the fields of the active_group_page record are initialized to nil values.

The talk state denotes a page in progress. The fields of the active_group_page record define the page information.

The aging state denotes a Group Page that occurred less than 15 minutes in the past. All of the fields of the active_group_page are initialized to nil values except the paging party swid and the tics_to_expire byte.

The num_gpaged_parties field is an integer value, in the range [nil_page_group_member..max_page_group_member], denoting the number of the page group members successfully connected for paging at the commencement of the page. The num_gpaged_parties denotes the number of the paged_party records pertinent to the page.

The tics_to expire field is an integer value, in the range [..max_gpage_tics_to_expire], denoting how many tics gpagemgr still has to tic before this page can be moved from aging state to idle state. The aforementioned "tics" are in the form of tokens given to a page which are periodically given up by the page such that after all tics have been expended the page will to be considered to have expired. This functionality is useful for controlling ancillary features such as how answers from paged devices are handled, but does not form part of the present invention.

The paging party record (active_group_page.paging_party) is a single record per page which holds four pieces of information regarding the paging party: pid, swid, aux_swid and group.

The pid field contains the process_id of the paging party. This field is set to nil_process_id when the paging party hangs up. As such, the field is only pertinent when the page state is gpage_talk. The swid field contains the sw_id of the paging device and, as such, it is a device swid not a broadcast group swid. This field is only pertinent when the page state is either gpage_talk or gpage_aging. When a paging device uses a non-prime line to dial a Group Page, aux_swid is used to store the non-prime line swid used to dial the page so that an answer can be returned to the broadcast group represented by the paging non-prime line. The answering function does not form part of the present invention. For instance, if the paging device is a sws_ss4, the aux_swid will store the ss4_line_swid field of the cr.this_party block of the paging device. Finally, the group field contains the multigroup group number of the paging party. This field is used when sending messages to the paging device while the page is in gpage_talk state.

The paged_party array of records holds information pertaining to each paged set in the page. Each active_group_page record comprises an array of paged_party records: paged_party [min$_{page}$_gropup_member..max_page_group_member], each comprising four fields: swid, msid, music_on and connected. The swid and msid fields contain the sw_id and ms_id, discussed briefly above, for the paged set. The msid is redundant as it can always be computed from the swid. However, it is added in the paged_party record to minimize swid-to-msid conversions. The swid is used to identify a pageable_device type, such as sws_ss4 for identifying a Mitel® SuperSet™ 4 telephone set, or sws_station for identifying an attendant. It does not refer to a broadcast group swid. The field music_on contains a Boolean flag indicating whether or not the paged device was listening to background music before it was paged. Finally, the "connected" field is a Boolean flag indicating whether or not a set is still listening to the page in progress. This flag is set to false when a paged party originates a call, or is seized by an incoming call.

The paged_per array (active_group_page.paged_per) is an array of paged peripheral controller records holding information pertaining to each Peripheral Unit (FIG. 1) involved in the page. Each active_group_page record comprises an array of paged_per records: paged_per [min_per_controller_number..abs_max_per_controller_number]. There is a one-to-one-mapping between this array, and the cntrlr_no field in a paged device msid. tx_csc_id and rx_csc_id are the id's of a pair of circuit switch channels allocated for each peripheral controller involved in the page. The rx channel is connected to the tx channel of the paging party, and is used to broadcast the page to all of the paged parties on the peripheral. The parties_on_per field contains an integer denoting the number of devices paged via the particular peripheral controller.

In order to better understand the logic and operation of the Group Page Manager and Paging Party Call processes, a simplified description of their algorithms is provided herein below, with reference to pseudo-code and the flowchart of FIG. 3.

The Paging Party Call process provides the paging device with an execution thread for carrying out the Group Page. Its specialized group paging responsibilities include: requesting the page group from gpagemgr; providing Group Page announcement tone to the paging and paged devices; connecting the rx channels of paged peripheral controllers to the tx channel of the paging device; updating the displays of paged devices; and informing Group Page Manager when the page is complete (i.e., page release).

The Paging Party Call process follows, by and large, the execution path of a normal calling party, with the following exceptions:

```
cppage_direct_page_setup (cpage.pas) modification, as follows:
    { A Group Page will pass through this routine because
    { Group Page uses the same FAC as direct set-to-set
    { paging. A Group Page, has nothing to do here, so we
    { return as fast as we can
    { }
    IF (cr.xlation_blk.dest.sw_slctr = sws_page_group)
    THEN
        cr.feature_active := group_page;
        return;
    ENDIF;
send_term_seize_msg (cplowlvl.pas) modification, as follows:
    if cr.feature_active = group_page
        do not allocate a terminator's call process and call record
                        send_term_seize_msg_to_gpagemgr(other_party)            (gpagemgr.pas)
szeorig_handle_pos_ack (cpszeorig.pas) modification as follows:
    . . .
    if cr.feature_active = group_page
        estimate_gpage_broadcast_channels_connect_delay(estimated_delay)        (gpagemgr.pas)
        delay (estimated_delay)
            gpagemgr_announce_group_page_to_paged_parties(page_group_id)        (gpagemgr.pas)
                apply paging tone to paging party
            gpagemgr_connect_per_channels (page_group_id)                       (gpagemgr.pas)
                                                            . . .
                            go directly to talk state
```

In operation, with reference to FIG. 3, responsive to a user at the paging device dialing a predetermined string of digits to initiate paging, the input handler for the device (which is also a process running on the MC) sends an origination request to the Paging Party Call process on the PBX main controller and passes the first dialed digit to that process. The Paging Party Call process then connects the paging device, applies silence (i.e. a string of zeroes in the PCM stream), and updates the device display to indicate that a call has been initiated. Next, the paging device transmits FAC (Feature Access Code) digits to the Paging Party Call process in response to which that process sets feature_active=direct_page. The Paging Party Call process then clears the FAC display at the paging device. The remainder of the dialed string is then transmitted to the Paging Party Call process. These digits are echoed back to the device to provide sidetone. The received digits translate to sws_page_group feature_active=group_page.

Next, the Paging Party Call process initiates seizing of a page group. Seizing a page group differs from the normal call control seizing of another party in that a paged group does not require a call process and a call record. The Group Page Manager process and the active Group Page record provide the necessary means for establishing and documenting the Group Page.

In order to accommodate these differences from the conventional normal call control seizing, a send_term_seize_msg (cplowlvl.pas) is provided which precludes allocation of a terminator call process and call record for a group paging call, and which formats and sends a termination message to the gpagemgr process. The paging party expects a pos_ack or a neg_ack from gpagemgr to determined whether of not the page group was successfully seized.

As indicated above, the termination message is sent to gpagemgr by a paging party's call process executing in send_term_seize_msg.

```
    .
    .
    .
IF      (rc = continue)
AND     (cr.feature_active IN [group_page, meet_me_answer])
THEN
        { this is a Group Page call or meet_me_answer, so we'll have to send out
        { our own msg to gpagemgr or the paging party. Note that this is the only
        { code executed in send_term_seize_msg in the case of a Group Page/mma.
        { }
        CASE cr.feature_active OF
            group_page:
                send_term_seize_msg_to_gpagemgr ( cr, new_party );
    .
    .
    .
```

It is interpreted by gpagemgr as a request by the paging party to page the group specified in the message. As a result, gpagemgr will send back either a pos_ack or a neg_ack, depending on the outcome of attempting to setup the Group Page.

```
gpagemgr_termination_seize_tmpl                    (gpagemgr.pas)
    TYPE
        gpagemgr_termination_seize_tmpl = RECORD
                paged_group_id           : page_group_range;
                paging_party_swid        : sw_id ;
                paging_party_aux_swid    : sw_id;
                paging_party_group       : multigroup_range;
        ENDREC ;
send_term_seize_msg_to_gpagemgr                    (gpagemgr.pas)
    PROCEDURE ENTRY send_term_seize_msg_to_gpagemgr
                    ( VAR cr : call_record;
                      VAR new_party : party_block);
    {SUMMARY:       Sets up and send the terminate/seize message to the page group
    {               Manager
    {PARAMETERS:
    { cr: is the call record of the calling party
    { new_party: is a party block containing the swid of the page group
    {
    {ASSUMPTIONS:   Called from the context of originating call process
    {
    {-}
    VAR
        msg_out            : message;
        group_page_data    : BOUND gpagemgr_termination_seize_tmpl;
    BEGIN { send_term_seize_msg_to_gpagemgr }
    .   format_msg_2_process  (termination, msg_out, gpage_mgr_process,
                              my_node.group, active_pid, c_p);
        BIND (group_page_data, msg_out.data);
        group_page_data.paged_group_id      := new_party.swid.page_group_id;
        group_page_data.paging_party_swid   := cr.this_party.swid;
        IF ( cr.this_party.swid.sw_slctr = sws_ss4 )
        THEN
            group_page_data.paging_party_aux_swid := cr.this_party.ss4_line_swid;
        ELSE
            group_page_data.paging_party_aux_swid := cr.this_party.swid;
        ENDIF;
        group_page_data.paging_party_group  := cr.this_party.group;
        group_page_data.tx_channel          := cr.this_party.tx_channel;
        cp_msgmon_send( msg_out );
ENDPROC { send_term_seize_msg_to_gpagemgr };
```

When the gpagemgr process is started, it initializes the Group Page Manager data structures (FIG. 2) to nil values, initializes a timer used to "age" the active Group Pages, and enters an infinite loop of receiving and processing interprocess messages. Thus, the termination message from the Paging Party Call process is received by the receive_any loop of group_page_Manager (gpagemgr.pas), as follows:

```
if gpagemgr_handle_new_gpage     (termination_message) successful
        send a pos_ack
    otherwise
        send a neg_ack with an exception
gpagemgr_handle_new_gpage(term_msg)              (gpagemgr.pas)
retrieve the group_id from the term_msg
    if active_group_page[group_id] is NOT idle or aging
        return termtr_busy exception
    otherwise
        temp_store <— active_group_page[group_id]
        retrieve active_group_page[group_id].paging_party info from term_msg
        if gpagemgr_request_paged_parties (group_id) is successful
            return success
        otherwise
            active_group_page[group_id] <— temp_store
            return exception or failure
gpagemgr_request_paged_parties(group_id)         (gpagemgr.pas)
retrieve a member of the page group from the database
    while there are more members in the page group database record do
        if gpagemgr_request_device (member_device_swid) returns an exception
            note the exception
        retrieve the next member of the page group from the database
    if at least one gpagemgr_request_device call was successful
        update the display of paged devices
        return success
```

```
                    -continued
       otherwise
           determine the best exception to describe the failure
           return the exception
gpagemgr_request_device(member_device_swid)    (gpagemgr.pas)
perform the following checks on member_device_swid
       pertains to a pageable device
       has the appropriate cos, cor and interconnect rights
       is idle
if member_device_swid passes all the checks
and gpagemgr_connect_device(member_device_swid, msid) is successful
       update the device display
otherwise
       return failure or exception
gpagemgr_connect_device(swid, msid)            (gpagemgr.pas)
retrieve per_id from msid
if active_group_page.paged_per[per_id] has not been treated yet
       if cannot allocate a pair circuit switch per_channels for the per
           return exception
       otherwise
           store the per channel ids in active_group_page.paged_per[per_id]
           store a has been treated flag in active_group_page.paged_per[per_id]
otherwise
       retrieve the per channel ids from active_group_page.paged_per[per_id]
write the page_group_id in the device's dam
connect the device broadcast channels to the per channels
```

It will be understood by a person of ordinary skill in the art that the gpagemgr process repeats the steps of connecting circuit switch channels to as many peripherals as are required to complete the Group Page, only one such peripheral and a single paged device being shown in FIG. 3 for the purpose of clarity.

peripheral controller uses its own circuit switch (not the main circuit switch) to deliver the broadcast to the paged devices.

The Group Page Manager uses a single interface function to indicate to a peripheral controller that a broadcast channel is to be setup (or released) for a paged device:

```
PROCEDURE gpagemgr_send_device_broadcast_channel_msg
       (gpagemgr.pas)
                            ( paged_device_msid      : ms_id;
                              paged_per_rx_channel   : csc_id;
                              connect_or_release     : byte );
       {ASSUMPTIONS:
       { paged_per_rx_channel is already allocated
       {-}
       VAR
           broadcast_channel_info_data   : BOUND broadcast_channel_info_template;
           msg_out                        : message;
       BEGIN { gpagemgr_connect_device_broadcast_channel }
           format_msg_2_per   (broadcast_channel_info, msg_out,
                                       paged_device_msid, active_pid, c_p);
           BIND (broadcast_channel_info_data, msg_out.data);
           WITH broadcast_channel_info_data DO
               chan1 := nil_channel_id;
               chan2 := paged_per_rx_channel;
               function_code1 := connect_or_release;
           ENDWITH;
           cp_msgmon_send( msg_out );
       ENDPROC { gpagemgr_connect_device_broadcast_channel };
```

Once the gpagemgr process has connected the broadcast channels to the connected peripheral, the page audio is broadcast to the paged devices located on that peripheral. For each peripheral controller of one or more devices to be paged, the Group Page Manager allocates a single pair of circuit switch channels to become the broadcast audio source for the paged devices through that controller. The As indicated above, the foregoing process is repeated for each paged device in the Page Group.

The paging party also uses an interface function to connect the rx channels of the paged peripheral controllers to the tx channel of the paging party:

```
PROCEDURE ENTRY gpagemgr_connect_per_channels( cr : call_record );(gpagemgr.pas)
{
{SUMMARY:
{ This procedure is called from the context of the Paging Party Call process
{ it connects the tx channel of the paging party to the rx channels of
{ all of the pers involved in the Group Page
{-}
VAR
    msg_out   : message;
    i         : integer;
    gpage_id  : page_group_range;
BEGIN { gpagemgr_connect_per_channels }
    WITH active_group_page [ cr.other_party.swid.page_group_id ] DO
        FOR i := min_per_controller_number TO abs_max_per_controller_number DO
            IF paged_per[i].parties_on_per > 0
            THEN
                format_send_connect_to_cs ( cr.this_party.tx_channel,
                                            paged_per[i].rx_csc_id,
                                            active_pid, msg_out );
            ENDIF {parties_on_per};
        ENDFOR {all possible pers};
    ENDWITH {active_group_page};
ENDPROC { gpagemgr_connect_per_channels_in_talk };
```

All of the data regarding the paged peripherals is stored in the active page record (paged_per:gpaged_per_type) discussed above with reference to FIG. 2.

A paged device is essentially a passive recipient of an audio broadcast through its speaker. From a call control viewpoint, the paged device is an idle device. Minor exceptions are noted where appropriate herein. A paged device is identified through a field, active_gpage_id, which is added to the device activity map (dam). Specific interface functions are provided in dam.pas to allow the Group Page Manager to update the new dam field: read_dam_active_gpage_id, which reads the active_gpage_id of the device dam; write_dam_active_gpage_id, which writes the active_gpage_id for the device dam, and dam_is_being_gpaged, which returns a true if the device is being Group Paged.

Also, a utility function, release_self_if_being_gpaged, is provided to allow a device's own call process to determine if the device is being Group Paged, and if so, to send a message to gpagemgr to release it from the Group Page. More particularly, this functions checks the dam to determine if the device is being paged. If so, it sends a release message to the Group Page Manager informing it that this set (self) no longer wishes to receive a Group Page. This is important to prevent gpagemgr from interfering with the device's audio connections when a Group Page is released while the (previously) paged set is engaged in some other connection. To this end, the interface function must be called by every originating call process in cpidl.pas, and by bgrpmgr as well as dvcmgr when seizing a termination device. The release_self_if_being_gpaged uses the same release message template, release_tmpl, discussed in greater detail above. However, in this case, the field paged_device_swid is defined as the swid of the paged device to be released such that gpagemgr releases only one device in the page group not the entire group.

As indicated above, the field, active_gpage_id, is provided in the device activity map (dam) to indicate whether or not a device is being Group Paged. The following elements of the dam data structure in dam.typ relate to this field:

```
device_pid_status =
    RECORD
    ...
        active_gpage_id : page_group_nil_range;
    ENDREC;
ss4_device_pid_status =
    RECORD
    ...
        active_gpage_id : page_group_nil_range;
    ENDREC;
```

The audio broadcast to the paged devices is achieved by creating broadcast links between the paging party and the paged peripheral controllers that, in turn, distribute the audio to their paged devices. The communication sequence pertaining to this function is in the form of unidirectional datagrams (i.e. the Group Page Manager does not expect any acknowledgement). The release message sent by a paged device to gpagemgr is also a unidirectional datagram. The paged device does not wait for an acknowledgment from gpagemgr confirming that it has been released from the Group Page in progress.

From the viewpoint of the page group Manager, releasing a page group entails formatting and sending an appropriate release message to gpagemgr in clr_prologue (cpclr.pas) as follows.

For Message:release, the realease_tmpl is modified to include a group_page_msg variant for the purposes of the Group Page, as follows:

```
release_tmpl =
    RECORD
    CASE function_code1 : byte OF
    .
    .
        group_page_msg:
            (paged_group_id : page_group_nil_range;
             paged_device_swid : sw_id );
    ENDREC;
```

The release message is utilized firstly by the paging party to indicate the conclusion of the Group Page, and secondly by the paged party to indicate that it is dropping out of a page. With respect to the former, the paging party sends a release message to gpagemgr in clr_prologue (cpclr.pas):

```
.
.
format_msg_2_cp(release, msg, this_party, other_party);
    IF (feature_active = group_page)
    THEN
        BIND (release_msg_data, msg.data);
        release_msg_data.function_code1 := group_page_msg;
        release_msg_data.paged_group_id := other_party.swid.page_group_id;
        release_msg_data.paged_device_swid := cp_nil_swid;
    ENDIF;
.
.
```

The paging party clearing down the page assigns a nil value to the paged_device_swid to indicate that all of the paged devices in the group should be released, as will be understood with reference to FIG. 2.

The Group Page Manager requires receipt of a release message in the event that a paged device drops out of the page prior to the conclusion of the page. This can occur in several situations, the most important of which are:

1) The paged device decides to originate a call
2) The paged device is seized by an incoming call process. This includes a multiline set being warbled on its prime line or a non-prime line appearance by a broadcast group manager process (bgrpmgr) which is essentially equivalent to a multi-line set manager process for managing connections to multi-line sets.

A paged device release is typically sent (i) by the originating device call process, (ii) by bgrpmgr immediately before warbling a multiline set, and (iii) by a device manager process (dvcmgr) which is essentially equivalent to a single line set manager process for managing connections to single sets, upon successful seizing of the device bgrpmgr.

In all of the above scenarios, a call is made to a utility procedure called release_self_if_being_gpaged that checks if the device is being gpaged (Group Paged), and if so, sends the required release message to gpagemgr. Note that in this case the paged_device_swid field in the release_tmpl is assigned the swid of the device desiring to drop out of the page (a pageable device swid in [sws_ss4, sws_station]).

```
release_self_if_being_gpaged                          (gpagemgr.pas)
PROCEDURE ENTRY release_self_if_being_gpaged ( swid : sw_id );
{SUMMARY:        Sets up and send the release group message to the page group
{                Manager if this device is currently being paged.
{
{ASSUMPTIONS:    Called from the context of a paged party wishing to
{                quit being paged.
{
{-}
VAR
        gpage_id        : page_group_nil_range;
        msg_out         : message;
        release_data    : BOUND release_tmpl;
        rc              : return_code;
        split_second    : STATIC relative_time := [ 0, 0, 0, 2 ];
BEGIN { release_self_if_being_gpaged }
    SET_UNPREEMPTABLE;
    rc := read_dam_active_gpage_id (swid, gpage_id);
    SET_PREEMPTABLE;
    IF      ( rc = success                              )
    AND     ( gpage_id <> nil_page_group_number )
    THEN
        { We need to notify gpagemgr that this device is dropping out of
        { the page
        { }
        format_msg_2_process (release, msg_out, gpage_mgr_process,
                                        my_node.group, active_pid, c_p);
        BIND (release_data, msg_out.data);
        release_data.function_code1 := group_page_msg;
        release_data.paged_group_id := gpage_id;
        release_data.paged_device_swid := swid;
        cp_msgmon_send( msg_out );
        { delay briefly to allow gpagemgr to clear the device
        { }
        rc := delay ( split_second );
    ENDIF { success and gpage_id > nil_page_group_number};
ENDPROC { release_self_if_being_gpaged };
```

To summarize, according to the present invention a Group Page process is implemented by which a variable audio source may be a dynamically allocated circuit switch channels for broadcasting to a group of devices. The process is implemented via message exchanges between a Group Page Manager which accesses a data structure relating to the grouped devices, and a Paging Party Call Process associated with the party desirous of broadcasting an audio page. The Group Page feature of the present invention requires allocation of fewer circuit switch channels than is possible according to prior art methodologies, thereby optimizing system bandwidth.

Alternatives and variations of the invention are possible within the sphere and scope of the claims appended hereto.

What is claimed is:

1. In a circuit switched communication system having a paging device desirous of broadcasting audio to a plurality of paged devices, the improvement comprising:

a Paging Party Call Process for receiving a request from said paging device to broadcast said audio to said plurality of paged devices and in response generating a termination message including a unique address for identifying said plurality of paged devices;

a group page data structure comprising at least one record identified by said unique address and containing connection information relating to said paging device and said plurality of paged devices; and a Group Page Process for receiving said termination message and in response accessing said group data structure and dynamically establishing circuit switch channels according to said connection information contained in said at least one record identified by said unique address for broadcasting said audio from said paging device to said paged devices.

2. The improvement of claim 1, wherein said plurality of paged devices are connected to one or more peripheral units, and wherein said group page data structure includes further connection information relating to said peripheral units.

3. The improvement of claim 2, wherein said record further comprises a header for indicating status of an associate group page, a paging_party record for storing said connection information relating to said paging device, a paged_party array record for storing said connection information relating to said plurality of paged devices, and a paged_per array record for storing said connection information relating to said one or more peripheral units.

4. A method of broadcasting an audio page to a group of paged devices from a paging device connected to a circuit switched communication system, comprising the steps of:

maintaining a data structure comprising at least one record identified by a unique address and containing connection information relating to said paging device and said plurality of page devices;

receiving a termination request message including said unique address from said paging device and in response accessing said data structure and dynamically establishing circuit switch channels according to said connection information contained in said at least one record identified by said unique address for broadcasting said audio from said paging device to said paged devices; and receiving a release message from said paging device following the broadcasting of said audio and in response clearing down said circuit switch channels.

5. The method of claim 4, further comprising the step of transmitting an acknowledgement message to said paging device in response to said circuit switch channels being established.

6. The method of claim 5, further comprising the step of providing group page announcement tone to said paging device and said plurality of paged devices subsequent to transmission of said acknowledgement message.

* * * * *